Patented Dec. 20, 1938

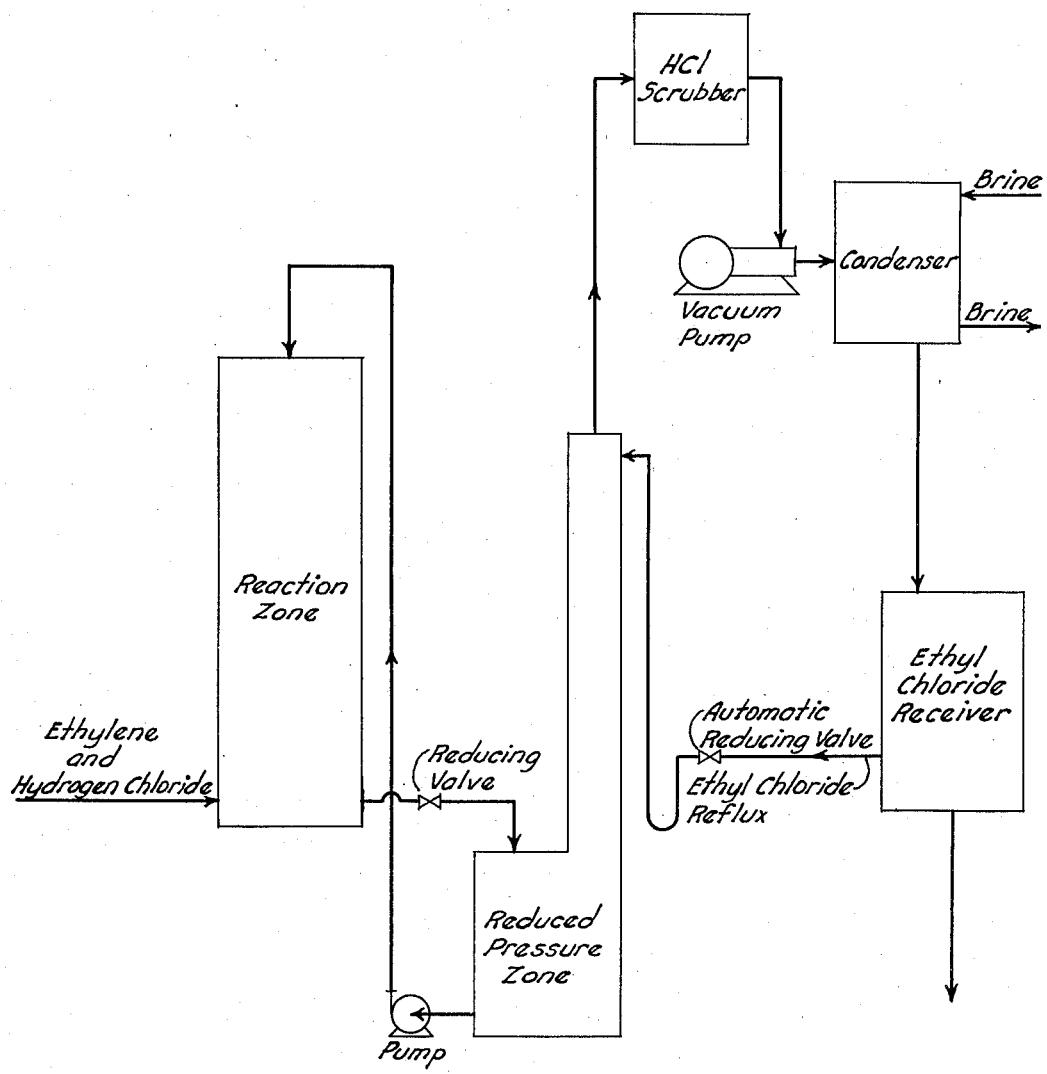

2,140,927

UNITED STATES PATENT OFFICE 2,140,927

PREPARATION OF ETHYL CHLORIDE

James E. Pierce, Midland, Mich., assignor to The Dow Chemical Company, Midland, Mich., a corporation of Michigan Application September 29, 1936, Serial No. 103,205

6 Claims. (Cl. 260—663)

The present invention relates to processes for the preparation of ethyl chloride by the direct addition of hydrogen chloride to ethylene, and, more particularly, to a continuous process for combining said reactants in the presence of a hydrohalogenation catalyst, such as aluminum chloride, carried in a liquid medium.

The preparation of ethyl chloride may be carried out by dissolving or suspending a hydrohalogenation catalyst in an inert liquid medium and contacting therewith a gaseous mixture of ethylene and hydrogen chloride in approximately equimolecular proportions under substantially anhydrous conditions at temperatures of 0° to 10° C. This invention concerns a continuous method of contacting said gaseous reactants with a liquid catalytic bath and separating the ethyl chloride produced, whereby the reaction temperature may be maintained without resort to indirect cooling systems. Such method comprises circulating the catalytic liquid through the contact zone wherein ethyl chloride is formed and remains largely dissolved in the liquid, thereafter subjecting the liquid in a separate zone to a pressure lower than that prevailing in the contact zone to vaporize ethyl chloride therefrom, condensing and collecting the so-vaporized ethyl chloride, and recycling the catalytic medium to the contact zone. A portion of the cold condensed ethyl chloride is returned to the feed liquor entering the zone of reduced pressure, the subsequent evaporation of which assists in refrigerating the circulating liquid catalyst to the desired degree.

This procedure permits the recovery of ethyl chloride from the liquid medium wherein it is produced in a substantially pure condition, avoids circulating large quantities of ethyl chloride in the catalytic medium, and eliminates the necessity of providing cooling means, such as an indirect brine cooling system, to maintain the liquid catalyst at the desired temperature.

Reference may be had to the single figure in the annexed drawing, which illustrates one arrangement of apparatus elements in which the invention hereinafter claimed may be carried out. The drawing also indicates diagrammatically the flow of materials according to the process herein disclosed.

The following example illustrates the practice of my invention:

The apparatus employed consisted essentially of a packed reaction tower, a chamber maintained under reduced pressure, a condenser for liquefying ethyl chloride vapor from said chamber, and means to circulate the catalyst-carrying liquor through the tower and chamber.

A solution consisting of 663 pounds of propylene chloride and 27.6 pounds of aluminum chloride was continuously circulated down through the tower, while an ethylene-containing gas of the composition hereinafter given was fed in at the bottom of the tower, together with an equivalent volume of gaseous hydrogen chloride, the mixed gases rising against the downflow of the catalytic solution.

The ethylene-containing gas was obtained by the pyrolytic decomposition of a petroleum oil followed by chlorination of the gas to remove unsaturates higher than ethylene, the analysis being:

| | Per cent by volume |
|---|---|
| Ethylene | 45 |
| Hydrogen chloride | 4 |
| Methane and homologues | 5 |
| Hydrogen | 44 |
| Air | 2 |

The above gas was fed in at the bottom of the tower at the rate of 4.54 pounds of ethylene, along with 5.4 pounds of hydrogen chloride, per hour. The catalyst solution was circulated through the tower at the rate of 36 pounds per minute. At the top of the tower the temperature of the catalyst solution was about 0° C., the pressure about 21 inches of water gauge, and at the bottom thereof the temperature was about 5° C. and the pressure about 27 inches. Approximately 82 per cent of the ethylene entering the tower was reacted therein, the concentration of ethyl chloride in the effluent liquor at the bottom of the tower being 3.92 per cent by weight. The effluent liquor from the bottom of the tower, after having added thereto at a substantially uniform rate about 24.6 pounds per hour of liquid ethyl chloride, was led into a chamber maintained under an absolute pressure of approximately 1.95 inches of mercury, wherein most of the ethyl chloride was flash-evaporated, the vapors passing to a condenser wherein the ethyl chloride was condensed and collected. The temperature of the liquor fed to the reduced pressure chamber was about 5.2° C., and the temperature of the liquor leaving said zone was lowered to about −1° C., due to the absorption of heat by the vaporization of ethyl chloride therefrom. The amount of ethyl chloride vapor separated and condensed from the circulating liquor was 33.7 pounds per hour. Of this quantity 24.6 pounds were returned in the liquid state to the catalyst liquor entering the reduced pressure zone. The stripped liquor leaving the low pressure zone, containing 3.5 percent by weight of ethyl chloride, was recirculated to the top of the reaction tower.

In the example I have shown that the vaporization of slightly less than an equivalent weight of ethyl chloride, compared with the weight of catalyst medium being circulated, from the body of circulating liquid catalyst medium is sufficient to maintain the medium at a temperature between about 0° and about 5° C. under ordinary conditions. In the event that it is desired to maintain the catalyst medium at lower temperatures than this, more ethyl chloride should be added to the catalyst medium after it is withdrawn from the reaction zone and before it is fed to the vacuum zone. Under such conditions a slightly higher concentration of ethyl chloride may also be maintained in the catalyst medium re-cycled to the reaction zone. Ordinarily, the reaction tower is maintained under about atmospheric pressure or very slightly thereabove. The extent to which the pressure in the vacuum zone is to be reduced is determined in part by the quantity of ethyl chloride to be vaporized in any given period of time, as well as by the temperature of the circulating liquid entering such zone; that is, for a given temperature condition the pressure should be maintained sufficiently low to cause the vaporization of the desired amount of ethyl chloride from the liquid entering the vacuum chamber.

Suitable chlorinated aliphatic hydrocarbons which may be employed in the preparation of the liquid catalytic medium hereinbefore mentioned are ethylene chloride, 1,1,2-trichloroethane, tetrachloroethylene, acetylene tetrachloride, propylene chloride, etc. Among the hydrohalogenation catalysts which may be used in the above-described process are aluminum chloride, and ferric chloride.

Other modes of applying the principle of my invention may be employed instead of those explained, change being made as regards the method herein disclosed, provided the step or steps stated by any of the following claims or their equivalent be employed.

I therefore particularly point out and distinctly claim as my invention:

1. In a method of preparing ethyl chloride by the reaction of hydrogen chloride with ethylene in the presence of a hydrohalogenation catalyst carried by a circulating inert liquid medium, the steps which consist in passing said circulating medium, containing ethyl chloride formed therein, from the reaction zone through a zone under lower pressure than that prevailing in the reaction zone without applying heat, to vaporize the ethyl chloride therefrom, and returning the stripped liquid medium to the reaction zone.

2. In a method of preparing ethyl chloride by the direct addition of hydrogen chloride to ethylene, the steps which consist in contacting a mixture of said reactants with an inert liquid medium carrying a hydrohalogenation catalyst, thereafter passing said medium into a zone under lower pressure than that prevailing in the contact zone without applying heat, collecting the ethyl chloride vaporized from the liquid medium in said lower pressure zone, and recirculating the stripped liquid catalytic medium to the reaction zone.

3. In a method of preparing ethyl chloride, the steps which consist in contacting a mixture of ethylene and hydrogen chloride with an inert liquid medium carrying a hydrohalogenation catalyst, withdrawing said medium from the contact zone and thereafter adding liquid ethyl chloride to said medium, then passing such mixture without applying heat into a zone maintained under lower pressure than that prevailing in the contact reaction zone, condensing the ethyl chloride vaporized from the liquid medium in the zone of lower pressure, and recycling the stripped liquid medium to the reaction zone.

4. In a method of preparing ethyl chloride, the steps which consist in contacting a mixture of ethylene and hydrogen chloride with an inert liquid medium carrying a hydrohalogenation catalyst, withdrawing said medium from the contact zone and thereafter adding liquid ethyl chloride to said medium, then passing such mixture without applying heat into a zone maintained under lower pressure than that prevailing in the raction zone, condensing the ethyl chloride vaporized from the liquid medium in the zone of lower pressure, recycling the stripped liquid medium to the reaction zone, and returning a portion of the condensed ethyl chloride for use in step 2.

5. In a method of preparing ethyl chloride, the steps which consist in contacting a mixture of ethylene and hydrogen chloride with a liquid medium consisting of a chlorinated aliphatic hydrocarbon carrying aluminum chloride initially supplied as such, withdrawing a portion of said medium, containing ethyl chloride formed therein, from the reaction zone, adding liquid ethyl chloride thereto, passing such liquid mixture without applying heat thereto into a zone maintained under lower pressure than that prevailing in the combining reaction zone to vaporize ethyl chloride therefrom, condensing the ethyl chloride vapor separated from the liquid chlorohydrocarbon in the zone of lower pressure, returning a portion of such condensate for use in step 3, and recycling the liquid medium from the zone of lower pressure, after ethyl chloride has been vaporized therefrom, to said reaction zone.

6. In a continuous method of preparing ethyl chloride the steps which consist in passing a mixture of ethylene and hydrogen chloride into contact with a liquid catalytic medium formed by incorporating aluminum chloride with a substantially anhydrous chlorinated aliphatic hydrocarbon maintained at a temperature below about 10° C., under approximately atmospheric pressure, withdrawing a portion of said liquid medium, containing ethyl chloride formed therein, from the reaction zone, adding liquid ethyl chloride thereto, passing such liquid mixture without applying heat thereto into a zone maintained under a sufficiently low pressure to vaporize the major portion of ethyl chloride therefrom and simultaneously lower the temperature of the liquid medium, cooling and condensing the ethyl chloride vapors, and recycling the liquid catalyst medium from the low pressure zone to the reaction zone.

JAMES E. PIERCE.